US008607238B2

(12) United States Patent
Nagpal et al.

(10) Patent No.: US 8,607,238 B2
(45) Date of Patent: Dec. 10, 2013

(54) LOCK WAIT TIME REDUCTION IN A DISTRIBUTED PROCESSING ENVIRONMENT

(75) Inventors: Abhinay Ravinder Nagpal, Pune (IN); Sri Ramanathan, Lutz, FL (US); Sandeep Ramesh Patil, Elmsford, NY (US); Matthew Bunkley Trevathan, Kennesaw, GA (US)

(73) Assignee: International Business Machines Corporation, Armonk, NY (US)

( * ) Notice: Subject to any disclaimer, the term of this patent is extended or adjusted under 35 U.S.C. 154(b) by 201 days.

(21) Appl. No.: 13/178,639

(22) Filed: Jul. 8, 2011

(65) Prior Publication Data

US 2013/0013833 A1      Jan. 10, 2013

(51) Int. Cl.
*G06F 9/46* (2006.01)
(52) U.S. Cl.
USPC ............. 718/102; 712/28; 712/29; 712/30; 712/31
(58) Field of Classification Search
None
See application file for complete search history.

(56) References Cited

U.S. PATENT DOCUMENTS

| | | | | |
|---|---|---|---|---|
| 5,459,871 | A * | 10/1995 | Van Den Berg | 718/104 |
| 7,735,089 | B2 | 6/2010 | Chan | |
| 2006/0206901 | A1* | 9/2006 | Chan | 718/107 |
| 2007/0143742 | A1* | 6/2007 | Kahlon et al. | 717/124 |
| 2007/0169002 | A1* | 7/2007 | Kronlund et al. | 717/130 |
| 2008/0282244 | A1* | 11/2008 | Wu et al. | 718/100 |
| 2010/0161573 | A1 | 6/2010 | Chan et al. | |

OTHER PUBLICATIONS

Joanne L. Holliday and Amr El Abbadi. "Distributed Deadlock Detection." Date printed Mar. 11, 2011 <http://www.cse.scu.edu/~jholliday/dd_9_16.htm>.
Y. Huang, et al. "On Mechanisms for Deadlock Avoidance in SIP Servlet Containers." Published in book: Principles, Systems and Applications of IP Telecommunications. Services and Security for Next Generation Networks. Lecture notes in Computer Science, 2008, vol. 5310/2008, pp. 196-216, Springer-Verlag Berlin, Heidelberg. URL: <http://www.cse.msu.edu/~stire/Papers/iptcomm08.pdf>.
Gartner, Inc. "Gartner Says a Green Data Centre Means More than Energy Efficiency." Egham, UK, Oct. 20, 2008. <http://www.gartner.com/it/page.jsp?id=781012&format=print>.

(Continued)

*Primary Examiner* — Emerson Puente
*Assistant Examiner* — Sisley Kim
(74) *Attorney, Agent, or Firm* — Jinesh P. Patel; Jason H. Sosa (57) ABSTRACT

Aspects of the present invention reduce a lock wait time in a distributed processing environment. A plurality of wait-for dependencies between a first plurality of transactions and a second plurality of transactions in a distributed processing environment is identified. The first plurality of transactions waits for the second plurality of transactions to release a plurality of locks on a plurality of shared resources. An amount of time the first plurality of transactions will wait for the second plurality of transactions in the distributed processing environment is determined based on the plurality of wait-for dependencies between the first plurality of transactions and the second plurality of transactions. Historical transaction data related to the plurality of wait-for dependencies between the first plurality of transactions and the second plurality of transactions is analyzed. The amount of time the first plurality of transactions will wait for the second plurality of transactions is reduced based on the historical transaction data.

14 Claims, 6 Drawing Sheets

(56) References Cited

OTHER PUBLICATIONS

IBM Corporation. "IBM Unveils Plan to Combat Data Center Energy Crisis; Allocates $1 Billion to Advance "Green" Technology and Services." Press Release 21524. May 10, 2007. <http://www-03.ibm.com/press/us/en/pressrelease/21524.wss>.

IBM Corporation. "IBM Project Big Green Tackles Global Energy Crisis." Press Release 24395. Jun. 11, 2008. <http://www-03.ibm.com/press/us/en/pressrelease/24395.wss>.

IBM. "Method and Algorithm for Distributed Deadlock Detection that Eliminates the Need for Construction of a Global Wait for Graph (GWFG) in the Distributed Database." IP.COM, IPCOM000169178D, Apr. 9, 2008.

R. Fichera with L. Koetzle, T. Powell. "Power and Cooling Heat Up the Data Center." Forrester Research, Inc. Mar. 8, 2006. <http://www.forrester.com/rb/Research/power_and_cooling_heat_up_data_center/q/id/38746/t/2>.

Oracle Berkeley DB. "Getting Started with Transaction Processing for C++", 11g Release 2. Published Aug. 27, 2010. <http://download.oracle.com/docs/cd/E17076_02/html/gsg_txn/CXX/BerkeleyDB-Core-CXX-Txn.pdf>.

Mahadevanna, Praveen. "Deadlock Detection Techniques for Distributed Systems." Department of Computer Science and Engineering, The University of Texas at Arlington (UTA). Date retrieved: May 10, 2011 <http://crystal.uta.edu/~kumar/cse6306/papers/praveen.pdf>.

Obermarck, Ron. "Distributed Deadlock Detection Algorithm." ACM Transactions on Database Systems (TODS), vol. 7, No. 2, pp. 187-208. ACM, New York, NY, USA. Jun. 1982.

\* cited by examiner

LOCK WAIT TIME REDUCTION IN A DISTRIBUTED PROCESSING ENVIRONMENT

TECHNICAL FIELD

The disclosure relates generally to distributed systems and more specifically to a method, computer program product, and computer system for reduction of lock wait time in a distributed processing environment.

BACKGROUND

In distributed data processing systems, data objects or resources, such as database tables, indexes, files, and other data structures, are often shared by multiple processes. If a data object or resource is accessed by two or more processes during the same time interval, problems may arise depending on the nature of the access. For example, if one process attempts to write a data object while another process is reading the data object, an inconsistent set of data may be obtained by the reading process. Similarly, if two processes attempt to write to the same data object during the same time interval, data corruption may result.

In a distributed processing environment, objects are typically accessed in the context of transactions. A transaction is an atomic unit of work. When an object is about to be accessed in the context of a particular transaction, but is already in use by another transaction, then the second transaction will often be required to wait until the first transaction has completed in order to ensure that each transaction accomplishes a logically consistent update. Because transactions are operating on multiple objects asynchronously, it is possible that a transaction that is about to go into a wait state may be doing so to wait for a second transaction that is already waiting on the first transaction for access to another resource. This is commonly called a deadlock as each transaction may wait for another indefinitely.

Even if a transaction is not involved in a deadlock, it might have to wait a considerable amount of time to obtain a lock because of a long-running transaction or transactions holding locks on the objects it needs. In such a situation, one might not want a transaction to wait indefinitely. When a requesting transaction requests the lock held by another transaction, the requesting transaction may set up a timer that will govern how long the requesting transaction will wait for the lock, called a lock wait timeout. In this situation, upon the expiration of the timer, the requesting transaction may just give up the wait for the lock. In such a case, the requesting transaction may never receive the lock and may never finish its task. Considerable time and processing effort may be wasted as a result of deadlocks and lock waits.

SUMMARY

In one aspect, a method for reducing a lock wait time in a distributed processing environment is provided. The method comprises a computer identifying a plurality of wait-for dependencies between a first plurality of transactions and a second plurality of transactions in a distributed processing environment, wherein the first plurality of transactions is waiting for the second plurality of transactions to release a plurality of locks on a plurality of shared resources. The method further comprises the computer determining an amount of time the first plurality of transactions will wait for the second plurality of transactions in the distributed processing environment based on the plurality of wait-for dependencies between the first plurality of transactions and the second plurality of transactions. The method further comprises the computer analyzing historical transaction data related to the plurality of wait-for dependencies between the first plurality of transactions and the second plurality of transactions. The method further comprises the computer reducing the amount of time the first plurality of transactions will wait for the second plurality of transactions based on the historical transaction data.

In another aspect, a computer program product for reducing a lock wait time in a distributed processing environment is provided. The computer program product comprises one or more computer-readable tangible storage devices and program instructions stored on at least one of the one or more computer-readable tangible storage devices. The program instructions comprise program instructions to identify a plurality of wait-for dependencies between a first plurality of transactions and a second plurality of transactions in a distributed processing environment, wherein the first plurality of transactions is waiting for the second plurality of transactions to release a plurality of locks on a plurality of shared resources. The program instructions further comprise program instructions to determine an amount of time the first plurality of transactions will wait for the second plurality of transactions in the distributed processing environment based on the plurality of wait-for dependencies between the first plurality of transactions and the second plurality of transactions. The program instructions further comprise program instructions to analyze historical transaction data related to the plurality of wait-for dependencies between the first plurality of transactions and the second plurality of transactions. The program instructions further comprise program instructions to reduce the amount of time the first plurality of transactions will wait for the second plurality of transactions based on the historical transaction data.

In another aspect, a computer system for reducing a lock wait time in a distributed processing environment is provided. The computer system comprises one or more processors, one or more computer-readable memories, one or more computer-readable tangible storage devices, and program instructions stored on at least one of the one or more storage devices for execution by at least one of the one or more processors via at least one of the one or more memories. The program instructions comprise program instructions to identify a plurality of wait-for dependencies between a first plurality of transactions and a second plurality of transactions in a distributed processing environment, wherein the first plurality of transactions is waiting for the second plurality of transactions to release a plurality of locks on a plurality of shared resources. The program instructions further comprise program instructions to determine an amount of time the first plurality of transactions will wait for the second plurality of transactions in the distributed processing environment based on the plurality of wait-for dependencies between the first plurality of transactions and the second plurality of transactions. The program instructions further comprise program instructions to analyze historical transaction data related to the plurality of wait-for dependencies between the first plurality of transactions and the second plurality of transactions. The program instructions further comprise program instructions to reduce the amount of time the first plurality of transactions will wait for the second plurality of transactions based on the historical transaction data.

DETAILED DESCRIPTION

The invention recognizes that the inability to coordinate access to lock among multiple transactions may slow down overall system performance because most of the time, the transactions hold on to their locks longer than they should, causing various problems, such as timeouts, deadlocks, and the like. Those problems are usually difficult to detect and debug. Moreover, these problems may spur a sequence of complicated "chain" reactions within a distributed data processing system.

The various embodiments of the present invention provide a method, a computer program product, and a computer system for reducing lock wait times in a distributed data processing system. In various embodiments, distributed data processing systems may include a plurality of shared resources. The term "resource", as used herein, refers to, for example, but not limited to, a variable, a data object, a persistent session object, a database, a table, a record, a list, a field, a memory region, a register, an I/O device, a file, a folder, a directory, a network connection, and the like. The term "shared resource", as used herein, refers to a resource which may be accessed by two or more transactions, processes, programs, routines, subroutines, functions, or other suitable software components and/or hardware components.

Resource locking is one technique that may be employed to avoid resource conflicts in a distributed data processing system. The term "resource locking", as used herein, refers to a protocol in which transactions signal their use of a resource by acquiring a lock on the shared resource from a lock manager. The term "lock", as used herein, refers to a data structure that indicates that a particular transaction has been granted certain rights with respect to a resource.

There are many types of locks. Some types of locks may be shared on the same resource by many transactions, while other types of locks prevent any other locks from being granted on the same resource. Typically, before using a resource, a requesting transaction checks to see if the corresponding lock is available. If so, the requesting transaction acquires the lock and uses the resource, releasing the lock when finished. However, as previously indicated, occasionally, the transaction may hold on to the lock even if the lock is no longer needed. The transaction may continue holding on to the lock for various reasons. For example, the transaction may hold on to the lock to avoid a time consuming procedure of reapplying for the lock. When the transaction anticipates that it may need the lock in the near future, instead of relinquishing the lock and then reapplying for it, the transaction may just continue holding on to the lock. However, such anticipation may be false, and the transaction may end up holding on to the lock but have no actual need for it in the future. If the lock is not available, the requesting transaction waits for the lock to be released by the prior acquiring transaction before using the resource. Generally, in such situations, the requesting transaction will place an intention lock, as discussed below in conjunction with FIG. 7.

In a distributed data processing system, multiple transactions may concurrently lock a shared resource so long as their respective uses of the shared resource are compatible. Generally, a transaction indicates the nature of its intended use of a shared resource by acquiring a lock to the shared resource in a particular mode. For example, a transaction that needs to write to a resource would typically acquire the corresponding lock in an exclusive mode to indicate that no other transactions should have read or write access to the shared resource. Once a shared resource is locked by an exclusive lock, requests to obtain the lock for read or write purposes are denied. On the other hand, a transaction that merely needs to read the shared resource could acquire the lock in a non-exclusive mode to indicate that other transactions may concurrently read the shared resource. Since the locking mode is indicative of the use of the shared resource, locks themselves may be referred to herein as being compatible or incompatible with each other. For example, exclusive locks are generally incompatible with any other resource access locks, while non-exclusive locks may be generally compatible with other non-exclusive locks.

An undesirable situation that can arise in a distributed data processing system is unnecessary overheads in acquiring a shared resource. When a requesting transaction requests the lock held by another transaction, the requesting transaction may set up a timer that will govern how long the requesting transaction will wait for the lock. The term "lock wait time", as used herein, refers to a time that a transaction spends waiting for another transaction to release a lock. In this situation, upon the expiration of the timer, the requesting transaction may just give up the wait for the lock. Consequently, the requesting transaction may never receive the lock and may never finish its task. This dependency may be particularly inconvenient to the transactions in distributed data processing systems competing for an exclusive lock. Typically, an administrator of a distributed data processing system sets a global lock timeout parameter to some finite value to prevent the application from hanging. It will be apparent to one skilled in the art, having one global value for all transactions across the system may not be the most efficient solution to managing resources.

Figure 1:
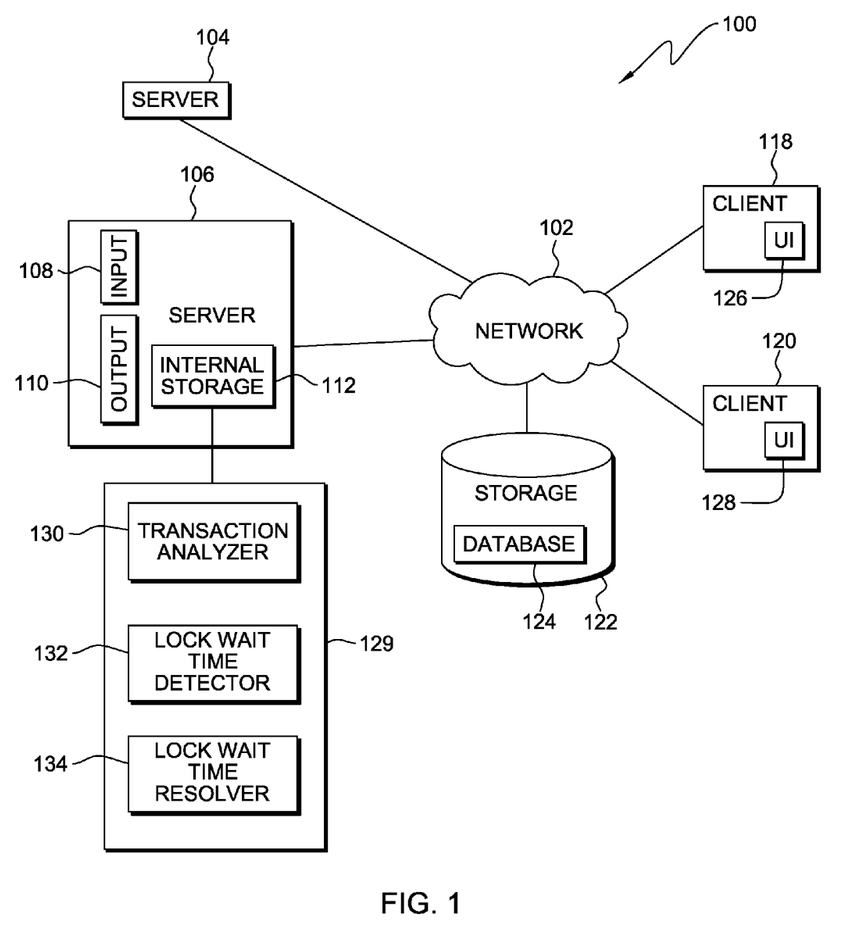
FIG. 1 is an illustration of a distributed data processing environment depicted in accordance with an illustrative embodiment.

With reference to FIG. 1, an illustrative diagram of a data processing environment is provided in which illustrative embodiments may be implemented. It should be appreciated that FIG. 1 is only provided as an illustration of one implementation and is not intended to imply any limitation with regard to the environments in which different embodiments may be implemented. Many modifications to the depicted environments may be made.

Distributed data processing system 100 is a network of computers with a distributed architecture. In the depicted example, distributed data processing system 100 is the Internet with network 102 representing a worldwide collection of networks and gateways that use the Transmission Control Protocol/Internet Protocol suite of protocols to communicate with one another. At the heart of the Internet is a backbone of high-speed data communication lines between major nodes or host computers consisting of thousands of commercial, governmental, educational and other computer systems that route data and messages. Of course, distributed data processing system 100 also may be implemented as a number of different types of networks, such as an intranet, a local area network (LAN), or a wide area network (WAN).

Distributed data processing system 100 contains network 102, which is the medium used to provide communications links between various devices and computers connected together within distributed data processing system 100. Network 102 may include connections, such as wire, wireless communication links, or fiber optic cables.

Client computers 118 and 120 connect to network 102. Client computers 118 and 120 may be, for example, mobile devices, telephones, cell phones, personal digital assistants, netbooks, laptop computers, tablet computers, desktop computers, and/or any other type of computing devices. In the depicted example, server computer 106 provides information, such as information computed locally or extracted from other computers on the network 102, to client computers 118 and 120. Server computer 106 may contain an input 108 and output 110 (an I/O device). Client computers 118 and 120 are clients to server computer 106 in this example. Client computers 118 and 120 may contain user interfaces (UIs) 126 and 128, respectively, which may include application level interfaces. UIs 126 and 128 can be, for example, graphical user interfaces (GUIs) or web user interfaces (WUIs). Distributed data processing system 100 may include additional server computers, client computers, displays and other devices not shown. It should be noted that a "distributed data processing system" may refer to intercommunicating computers across a network, intercommunicating processes within a single computer system, or even intercommunicating software modules, components, or objects within a given software application, as examples. Accordingly, the term "distributed data processing system" (or "distributed processing environment"), as used herein, is not intended to be limited to multiple computers that are remote from each other, except when accompanying language specifies this type of arrangement.

Each server computer 104, 106 of distributed data processing system 100 may include a different configuration of hardware and software modules. For example, server computer 104 and server computer 106 may have different types and quantities of processors, different application programs and different peripherals. Additionally, the communication path between computers of distributed data processing system 100 may include a number of networking components, for example, but not limited to, firewalls, routers, proxies and gateways. In some embodiments, distributed data processing system 100 may be specifically configured to run distributed applications. Each portion of a distributed application, in addition to being configured for proper operation in a stand-alone mode, may also be configured to appropriately communicate with other portions of the distributed application, as well as other computers in associated distributed data processing system 100.

Lock wait policy program 129 located in distributed data processing system 100 may be stored on one or more computer-readable tangible storage devices, which may include internal storage 112 on server computer 106 and downloaded to a data processing system or other device for use. Lock wait policy program 129 may communicate via remote processes, such as in accordance with a signal having one or more data packets (for example, but not limited to, data from one program interacting with another program in a distributed data processing system, and/or across a network 102 with other systems via the signal). Data gathered, generated, and maintained for use by lock wait policy program 129 may be kept in internal storage 112 of server computer 106 or in one or more databases 124 of storage unit 122.

Lock wait policy program 129 may include various programs or program components, such as transaction analyzer 130, lock wait time detector 132, and lock wait time resolver 134. Transaction analyzer 130 may be, for example, a computer program or program component for analyzing historical transaction data in distributed data processing system 100. Lock wait time detector 132 may be, for example, a computer program or program component for determining global lock wait time in distributed data processing system 100. Lock wait time resolver 134 may be, for example, a computer program or program component for reducing global lock wait time in distributed data processing system 100. In one embodiment, transaction analyzer 130, lock wait time detector 132, and lock wait time resolver 134 run on the same server 106, as shown in FIG. 1. However, in various embodiments it may be necessary or desirable to run one or more of transaction analyzer 130, lock wait time detector 132, and lock wait time resolver 134 on different distributed servers.

Figure 2:
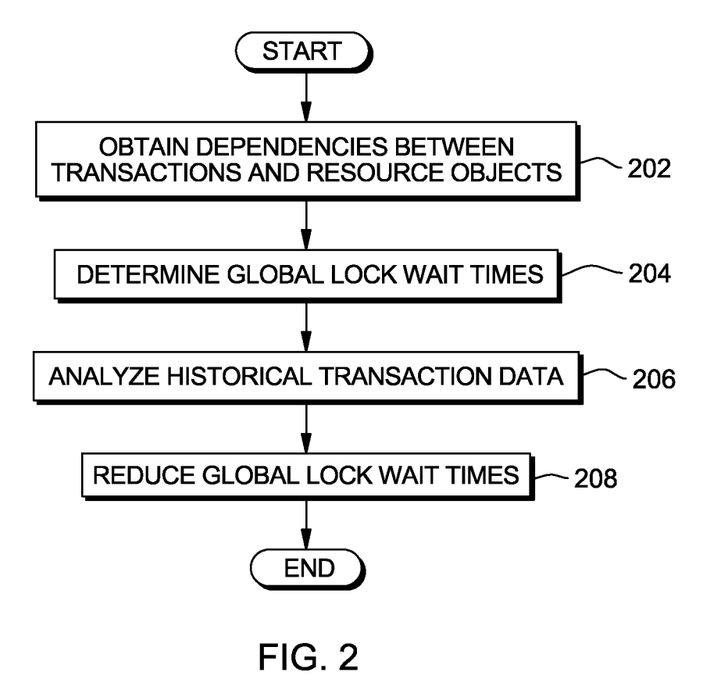
FIG. 2 is a flowchart of a process for reducing lock wait times in accordance with an illustrative embodiment.

Turning now to FIG. 2, FIG. 2 is a flowchart of a process for reducing lock waits times in accordance with an illustrative embodiment. According to one aspect of the present invention, discussed further below in conjunction with FIG. 3, at step 202, lock wait time detector 132 obtains data corresponding to dependencies between transactions and resource objects within distributed data processing system 100. At step 204, according to another aspect of the present invention, discussed further below in conjunction with FIG. 4, lock wait time detector 132 computes global lock wait time values and transmits these values to lock wait time resolver 134. At step 206, discussed further below in conjunction with FIG. 7, transaction analyzer 130 retrieves and analyzes historical transaction data. At step 208, according to yet another aspect of the present invention, lock wait time resolver 134 reduces lock wait times within distributed data processing system 100 by utilizing information provided by the transaction analyzer 130 and lock wait time detector 132 at steps 204 and 206, respectively.

As previously indicated, in distributed data processing system 100 the plurality of server instances 104 may comprise any number of computer nodes interconnected through a communication network 102. As used herein, the term "node" refers to any computer system or device that is uniquely addressable, or otherwise uniquely identifiable, in a network (for example, network 102) and that is operable to communicate with other nodes in the network. For example, and without limitation, a node may be a server computer 104, a client computer 118, a consumer electronic device, a mainframe computer, or the like. Further, the "nodes" of a distributed processing environment may refer to any intercommunicating objects of a given system. For instance, each "node" may be separate clusters of computers, separate individual computers, separate processors implemented on one or more computers, or separate processes executing on a single computer, as examples. Transactions may be either local or global, wherein the global transactions require communication among participating nodes. Transaction operations are typically carried out by processes. When a transaction is initiated, it is executed by a process. When the process needs resources, such as shared objects, at other nodes, one process, called a child process, is created at each corresponding remote node to represent the parent process at that node, which typically carries the transaction identifier of its parent process. The term "global wait time", as used herein, refers to a wait time involving transactions executing at two or more nodes. Therefore, to determine global lock wait time distributed data processing system 100 should employ a mechanism for recording a global state of that system. Each process of a distributed data processing system has a local state. The state of a process is typically characterized by the state of its local memory and a history of its activity. The global state of a distributed data processing system is a collection of the local states of its processes.

Figure 3:
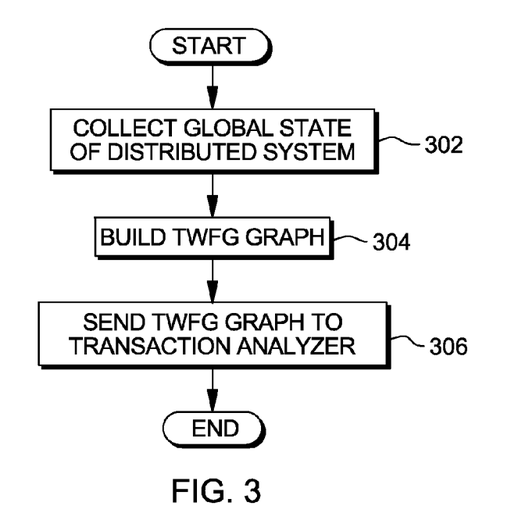
FIG. 3 is a flowchart of lock wait time detector program in accordance with an illustrative embodiment.

FIG. 3 is a flowchart of lock wait time detector program 132 in accordance with an illustrative embodiment. According to one aspect of the present invention, discussed further below in conjunction with FIG. 4, at step 302, lock wait time detector 132 determines dependencies between transactions and shared resource objects within a distributed data processing system by collecting global state of the distributed data processing system. At step 304, according to another aspect of the present invention, discussed further below in conjunction with FIG. 5, lock wait time detector 132 constructs a transaction wait-for graph (TWFG) based on the information obtained at step 302. At step 306, lock wait time detector 132 sends the constructed TWFG graph to transaction analyzer 130.

Figure 4:
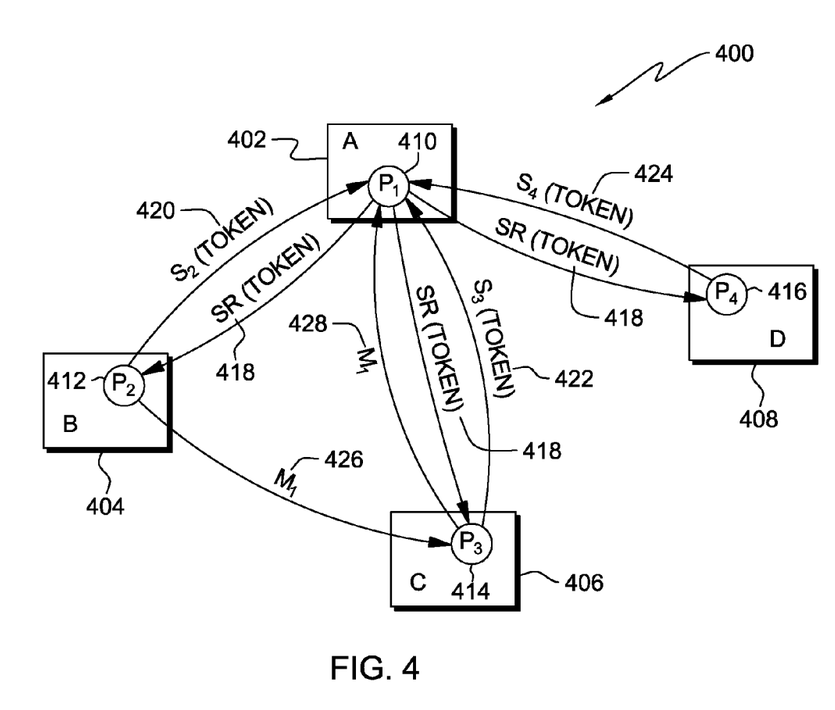
FIG. 4 is a block diagram illustrating a snapshot method in accordance with an illustrative embodiment.

Lock wait time detector 132 may utilize a variety of methods to collect the global state of a distributed data processing system. In an illustrative embodiment, lock wait time detector 130 may employ a snapshot method to obtain the global state of the system. FIG. 4 is a block diagram illustrating a snapshot method in accordance with the illustrative embodiment. Lock wait time detector 132 may invoke the method described below at periodic predetermined periods of time. In this example, distributed data processing system 400 includes server computer A 402, server computer B 404, server computer C 406, and server computer D 408. Lock wait time detector 132 may run on, for example, server A 402 as an observer process $P_1$ 410. The term "observer process", as used herein, refers to a process that initiates global snapshot collection. In addition, as shown in FIG. 4, process $P_2$ 412 runs on server B 404, process $P_3$ 414 runs on server C 406, and process $P_4$ 416 runs on server D 408.

Lock wait time detector 132 initiates snapshot collection by saving its own local state, for example, $S_1$ (not shown). Next, process $P_1$ 410 sends a set of snapshot request messages bearing a snapshot token to all other processes, depicted in FIG. 4 as SR (token) messages 418. The snapshot token may be, for example, but not limited to, a bit string. According to the snapshot method, processes receiving the snapshot token for the first time on any message send the observer process $P_1$ 410 their own local state, depicted in FIG. 4 as $S_2$ (token) 420 (local state of process $P_2$ 412), $S_3$ (token) 422 (local state of process $P_3$ 414), and $S_4$ (token) 424 (local state of process $P_4$ 416). It should be noted that processes $P_2$ 412, $P_3$ 414, and $P_4$ 416 will attach the snapshot token to all subsequent messages to help propagate the snapshot token throughout distributed data processing system 400. Furthermore, according to the exemplary snapshot method, if a process that has already received the snapshot token receives a message that does not bear the snapshot token, this process will forward that message to the observer process. For example, if process $P_3$ 414 receives message $M_1$ 426, which does not include the snapshot token, process $P_3$ 414 will forward message $M_1$ 428 to process $P_1$ 410. Since message $M_1$ 426 does not include the snapshot token, it must have been sent before the snapshot token was sent out. Therefore, message $M_1$ 426 needs to be included in the global snapshot collection.

As a result, lock wait time detector 132 builds a global state of distributed data processing system 400 by collecting local states for each process. In an embodiment, lock wait time detector 132 may store the resultant global state in one or more databases 124 of storage unit 122. The local state of a process at any time may be defined by the contents of processor registers, stacks, local memory, or the like shared resource objects and may be highly dependent on the local context of the distributed application. Therefore, in an embodiment, by collecting a global state of the distributed data processing system, lock wait time detector 132 obtains data corresponding to dependencies between processes and shared resource objects. Consequently, by identifying transactions that initiated each process, lock wait time detector 132 can obtain dependencies between transactions that are waiting for shared resources and transactions that are holding locks on shared resources.

As shown in FIG. 3, at step 304, lock wait time detector 132 constructs a TWFG graph. In an illustrative embodiment, lock wait time detector 132 may construct a TWFG using information obtained at step 302. Lock wait time detector 132 may construct and maintain TWFG graph, which indicates wait-for dependencies between transactions, as a directed graph structure. TWFG may consist of vertices interconnected by edges. The vertices represent transactions. The edges represent dependencies (wait-for relationships) between transactions.

Figure 5:
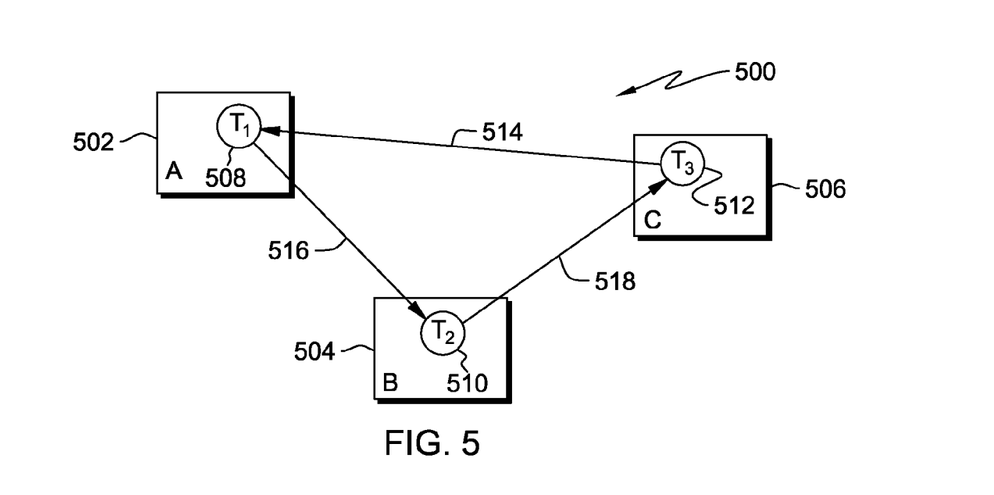
FIG. 5 is a block diagram illustrating an exemplary transaction wait-for graph.

FIG. 5 is a block diagram illustrating an exemplary TWFG graph. In this example, distributed data processing system 500 includes server computer A 502, server computer B 504, and server computer C 506. As shown, transaction $T_1$ 508 runs on server A 502, transaction $T_2$ 510 runs on server B 504, and transaction $T_3$ 512 runs on server C 506. Directed arc 514 from $T_3$ 512 to $T_1$ 508 indicates that the transaction represented by vertex $T_3$ 512 waits for the transaction represented by vertex $T_1$ 508. Directed arc 516 from $T_1$ 508 to $T_2$ 510 indicates that the transaction represented by vertex $T_1$ 508 waits for the transaction represented by vertex $T_2$ 510. Finally, directed arc 518 from $T_2$ 510 to $T_3$ 512 indicates that the transaction represented by vertex $T_2$ 510 waits for the transaction represented by vertex $T_3$ 512.

As can be seen from FIG. 5, in distributed data processing system 500, one server computer, such as 502, may not have enough information to determine global wait time. A given server (node) in distributed data processing system 500 typically has information about the transactions it manages, what locks they hold, and what locks they are waiting for. However, this node may not have information about transactions on other servers blocking those pending locks. For this reason, global wait time can be determined only by collecting information from all nodes within a distributed data processing system.

As previously indicated, lock wait time detector 132 determines global wait time. In various embodiments, lock wait time detector 132 may employ the notion of a node external. The term "node external", as used herein, refers to that part of the global TWFG not visible to a given node. If a node does not know what transactions or collections of transactions it is waiting for, then it is said to be waiting for the node external. Similarly, if a node does not know what transactions are waiting for it, then the node external is said to be waiting for it. Furthermore, in various embodiments, lock wait time detector 132 may employ the notion of a potential global cycle. The term "potential global cycle", as used herein, refers to a cycle which contains the node external. Each node within a distributed processing system may construct a potential global cycle if it knows about its interactions with the node external. This cycle is referred to as a potential global cycle because each node may not have enough information to determine exactly what the node external represents. Consequently, each node is typically unable to determine whether the cycle containing the node external is an actual deadlock or not. In an embodiment, lock wait time detector 132 can determine global wait time and detect global deadlocks by collecting information about potential global cycles from all the nodes and by matching up the node external ends of potential global cycles. In the example depicted in FIG. 5, transaction $T_1$ 508 is waiting for transaction $T_2$ 510, transaction $T_2$ 510 is waiting for transaction $T_3$ 512, transaction $T_3$ 512 is waiting for transaction $T_1$ 508. This dependency may be represented, for example, as $T_1 \rightarrow T_2 \rightarrow T_3 \rightarrow T_1$. Then a potential global cycle may be represented as EX→n→EX, where EX represents the node external and n represents one or more transactions whose dependencies (wait for relationships) connect the node external to itself. According to another aspect of the present invention, in order to construct a potential global cycle, each node within a distributed data processing system needs to have information about a transaction waiting for the node external, which can be represented as →EX. A transaction on a given node waits for the node external if it is waiting for a lock and no transaction known to that given node is holding the lock. Furthermore, in order to construct a potential global cycle each node within a distributed data processing system needs to have information about a transaction waited for by the node external, which can be represented as EX→. A transaction on a given node is waited for by the node external if it is blocking a request from a transaction running on another node.

In various embodiments, lock wait time detector 132 may be implemented as a distributed program. In an illustrative embodiment, lock wait time detector 132 may comprise a global lock time manager (GLM) and a local lock time detector (LLD). GLM component of lock wait time detector 132 may be responsible for coordinating global wait time processing. LLDs may run on all nodes within a distributed data processing system and GLM may run on a dedicated node.

Figure 6:
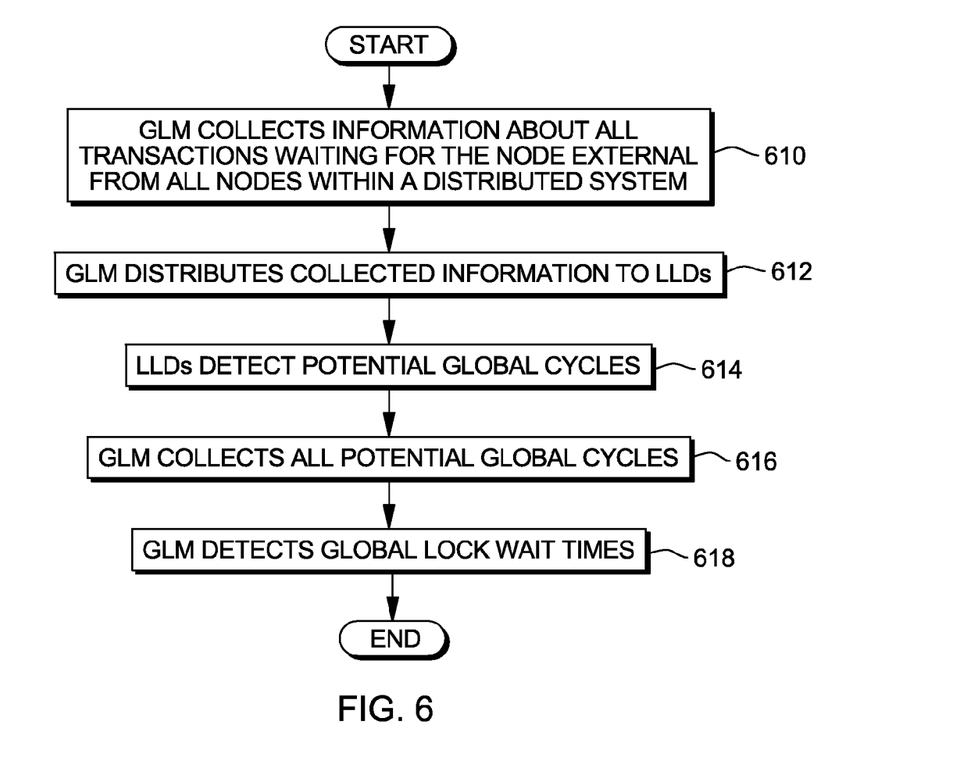
FIG. 6 is a flowchart of an illustrative method that may be employed by lock wait time detector program to determine global lock wait time.

FIG. 6 is a flowchart of an illustrative method that may be employed by lock wait time detector 132 to determine global lock wait time. At the start of the collection phase (step 610) each LLD sends information about all transactions running on the corresponding server and waiting for the node external to GLM. GLM collects that information and builds one list containing all transactions waiting for the node external. This list may be constructed and maintained by lock wait time detector 132, for example, as a TWFG. At step 612, GLM sends this list to all LLDs. It should be noted that information may be routed through GLM for efficiency purposes. Since a percentage of locks that are typically pending at any instance in time is substantially small, the amount of information exchanged at this point is substantially small as well. If a distributed data processing system comprises N servers, where N is an arbitrary integer number, and all N servers were to send the information about transactions waiting for the node external to each other, they would generate N*(N−1) messages. However, if all N servers send their information to GLM and GLM then responds with the list, the number of messages generated is equal to only 2*(N−1).

At step 614, LLDs detect potential global cycles. This step involves detecting all deadlocks involving the node external. In this step, lock wait time detector 132 may employ any of the algorithms known in the art for detecting cycles in a directed graph. At this point the LLD will know that either none of its transactions are involved in a global deadlock, or that some of the transactions may be involved. If LLD knows that some of the transactions may be involved, it also knows the exact wait-for arc (edge of the global TWFG, such as 516 shown in FIG. 5) representing each potential global deadlock interaction with the corresponding node. At step 616, the LLDs send these potential global cycles to the GLM. In an embodiment, LLDs may send these potential global cycles as edges of the global TWFG.

At step 618, the GLM merges these potential global cycles together. Advantageously, the amount of information that GLM has received from the LLDs has been filtered by LLDs, so that the GLM receives the minimum amount of information that is necessary to determine global lock wait time and to detect global deadlocks. Since in this embodiment each LLD has sent edges of the global TWFG (step 616), at this point the GLM only needs to pair up the ends of the potential cycles to determine if a true global deadlock exists.

At this point, by traversing the global TWFG, lock wait time detector 132 calculates global wait times. In other words, lock wait time detector 132, at step 618, calculates an amount of time the plurality of transactions will wait for the shared resources to become available based on the plurality of wait-for dependencies between the transactions represented in the global TWFG. In addition, by identifying global deadlocks, lock wait time detector 132 will determine whether some transactions may wait forever for shared resources if global deadlocks are not resolved. Lock wait time detector 132 forwards TWFG information to transaction analyzer 130 and lock wait time resolver 134.

Figure 7:
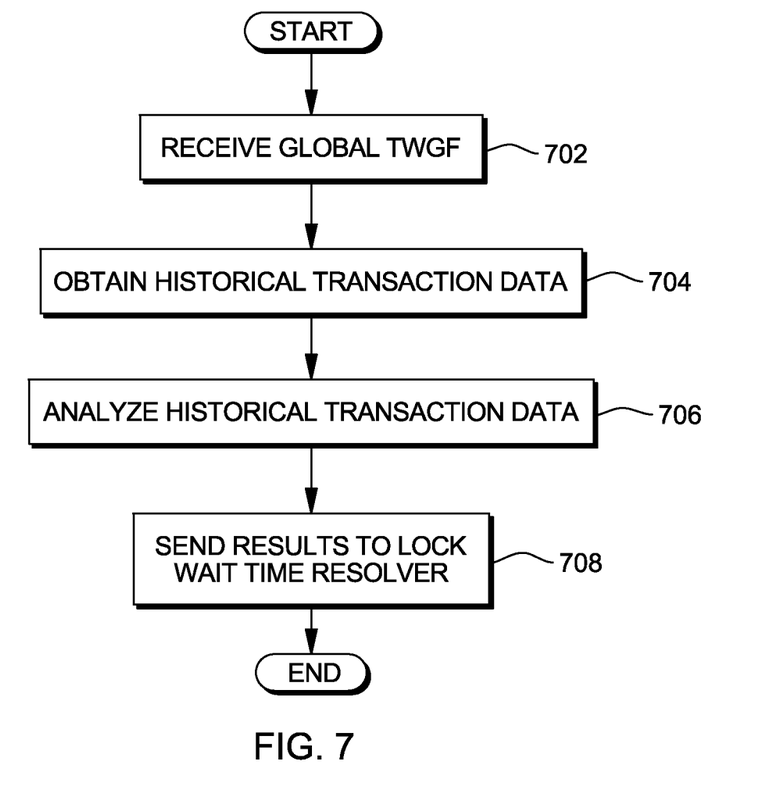
FIG. 7 is a flowchart of transaction analyzer program in accordance with an illustrative embodiment.

FIG. 7 is a flowchart of transaction analyzer program 130 in accordance with an illustrative embodiment. At step 702, transaction analyzer 130 receives a global TWFG constructed by lock wait time detector 132, representing wait-for dependencies between transactions within a distributed data processing system.

Transaction analyzer 130 may leverage a large set of historical transaction data from a distributed data processing system. Transaction data may be accumulated during the course of application execution in the distributed data processing system. At step 704, transaction analyzer 132 obtains historical transaction data. According to some embodiments, transaction data may be retrieved from an archive of past transactions. Archived transactions may be stored, for example, but not limited to, one or more databases 124 of storage unit 122. Historical data may include, for example, but not limited to, lock history information, lock table for shared resources, usage patterns and the like. Lock history of a transaction may be, for example, but not limited to, a record of all types of locks on any resources that were requested by that transaction and a duration that locks were held. Each transaction typically carries its lock history during its execution. An example for a lock history of transaction $T_i$ is: {R ($R_4$B), 5; W ($R_1$B), 1; W ($R_3$A), 8}. This exemplary lock history shows that $T_i$ held a read (R) lock on resource $R_4$ at node B for 5 seconds, a write (W) lock on resource $R_1$ at node B for 1 second, and the write (W) lock on resource $R_3$ at node A for 8 seconds. As previously indicated, only a single transaction may hold an exclusive write lock on a resource. Lock table of a resource may be, for example, but not limited to, a record of all transactions which have held a lock on the resource and all transactions which have requested a lock on the resource along with corresponding durations. A request on the lock may be recorded as an intention lock (I) indicating that the transaction wishes to acquire a lock on a resource, either to modify it (IW) or to read it (IR). It should be noted that the intention locks typically may be placed in a resource lock table when the requested resource is already locked by another transaction. An example of a lock table for a resource $R_i$ at node B is: {R ($T_3$B), 2; W ($T_2$B), 7; IW ($T_1$A), 4}. The lock table for resource $R_i$ shows that transaction $T_3$ at node B held a read lock on $R_i$ for 2 seconds, transaction $T_2$ at node B held a write lock on $R_i$ for 7 seconds, and that transaction $T_1$ at node A held an intention write lock for 4 seconds. It should be noted that any number of intention locks may be placed on a resource, which means that any number of transactions may wait for a resource.

At step 706, transaction analyzer 130 analyzes transaction data with regard to particular transactions in the global TWFG graph. In one embodiment, transaction analyzer 130 may perform data mining and correlation among the data contained in the TWFG graph and historical transaction data. In this embodiment, transaction analyzer 130 may analyze usage patterns for all transactions in the received TWFG graph. As previously indicated, usage patterns are historical transaction data that may be obtained from one or more databases 124 of storage unit 122. A wide range of usage patterns may be used to assist with analysis. For example, transaction analyzer 130 may analyze usage patterns based on types of locks held by a transaction, corresponding durations, requested resources, patterns of communications between transactions, and any other patterns that can be discerned from data that is collected by a distributed data processing system. Usage patterns may be analyzed using various predictive algorithms, such as, but not limited to, regression techniques (least squares and the like), neural net algorithms, learning engines, random walks, Monte Carlo simulations, and the like.

For illustrative purposes only, consider a scenario where transaction analyzer 130 determined that transaction A is holding a lock and transaction B is waiting for that lock based on the TWFG graph. In this scenario, if a global lock timeout parameter is set to 30 seconds, transaction B will be blocked for 30 seconds waiting until transaction A will release the lock. Upon the expiration of 30 seconds transaction B may just give up the wait for the lock. However, if it can be determined, based on usage patterns, that transaction A will hold the lock for another 100 seconds, there is no need for transaction B to wait for 30 seconds. Similarly, if it can be determined that transaction A will hold the lock for 31 seconds, the lock timeout setting may be scaled to 31 seconds. It is to be understood, that by using historical transaction information, the system disclosed herein may predict how long will a transaction be holding to a lock and may choose appropriate action to reduce lock wait time. At step 708, transaction analyzer 130 sends analyzed results to lock wait time resolver 134.

Lock wait time resolver 134 may use a variety of techniques to reduce global lock wait time. In an illustrative embodiment, lock wait time resolver 134 may adjust configurable lock wait timeout settings based on information provided by transaction analyzer 130. Alternatively, if transaction analyzer 130 identifies some transactions which requested an access to a shared resource which, based on historical transaction data, will not become available until the expiration of a pre-determined lock timeout period, lock wait time resolver 134 may choose to abort such transactions. A variety of other techniques may be utilized by lock wait time resolver 134 to reduce global wait time in a distributed data processing system.

Figure 8:
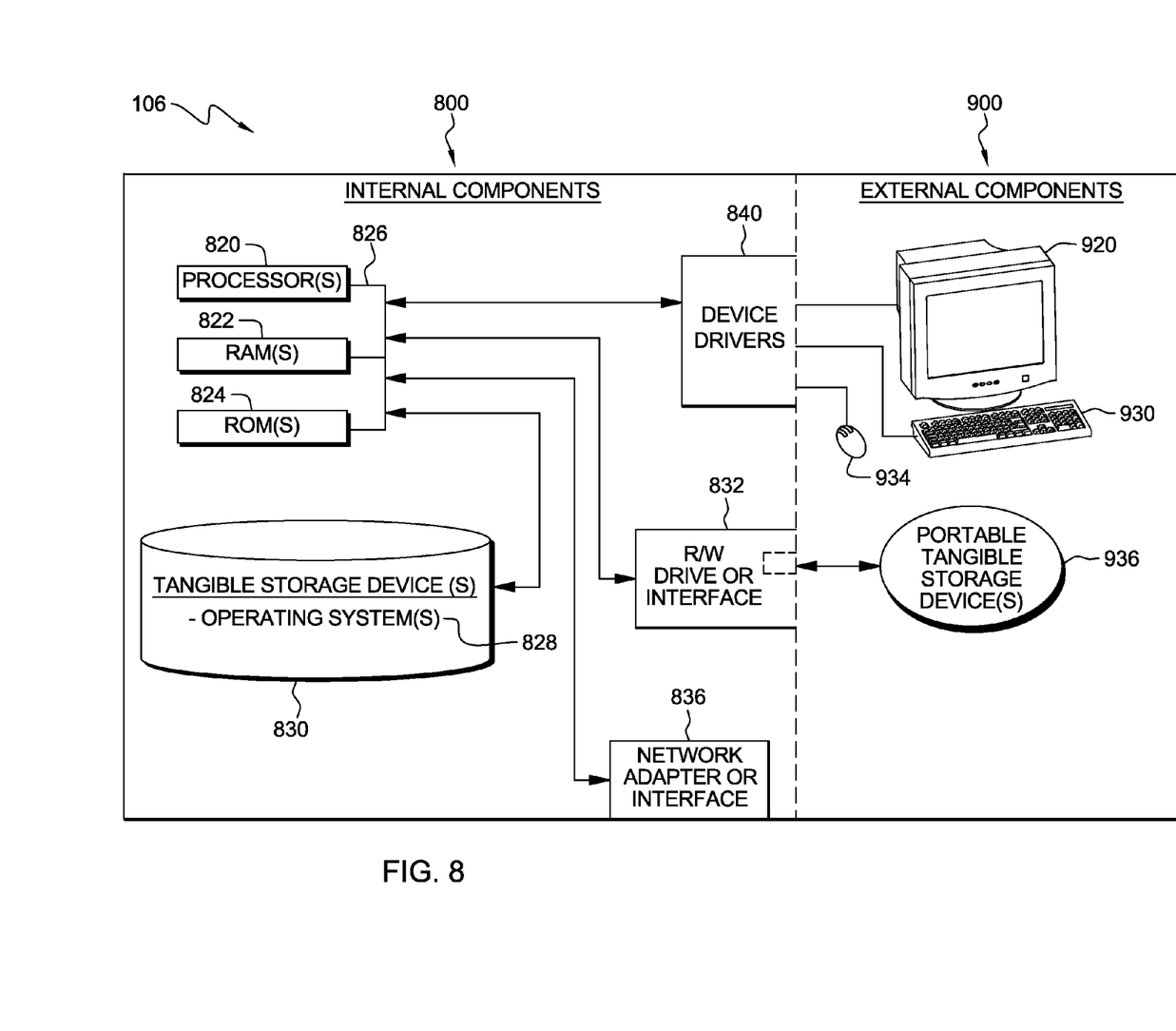
FIG. 8 illustrates internal and external components of a server computer in accordance with an illustrative embodiment.

FIG. 8 illustrates internal and external components of distributed server computer 106 in accordance with an illustrative embodiment. Distributed server computer 106 includes internal components 800 and external components 900. Internal components 800 include one or more processors 820, one or more computer-readable RAMs 822 and one or more computer-readable ROMs 824 on one or more buses 826, and one or more operating systems 828 and one or more computer-readable tangible storage devices 830. The one or more operating systems 828, transaction analyzer 130, lock wait time detector 132, and lock wait time resolver 134 are stored on one or more of the computer-readable tangible storage devices 830 for execution by one or more of the processors 820 via one or more of the RAMs 822 (which typically include cache memory). In the embodiment illustrated in FIG. 8, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Internal components 800 also include a R/W drive or interface 832 to read from and write to one or more portable computer-readable tangible storage devices 936 such as a CD-ROM, DVD, memory stick, magnetic tape, magnetic disk, optical disk or semiconductor storage device. The transaction analyzer 130, lock wait time detector 132, and lock wait time resolver 134 can be stored on one or more of the portable computer-readable tangible storage devices 936, read via R/W drive or interface 832 and loaded into one or more computer-readable tangible storage devices 830.

Internal components 800 also include a network adapter or interface 836 such as a TCP/IP adapter card. The transaction analyzer 130, lock wait time detector 132, and lock wait time resolver 134 can be downloaded to computer sever 106 from an external computer via a network (for example, the Internet, a local area network or other, wide area network) and network adapter or interface 836. From the network adapter or interface 836, the transaction analyzer 130, lock wait time detector 132, and lock wait time resolver 134 are loaded into one or more computer-readable tangible storage devices 830. The network may comprise copper wires, optical fibers, wireless transmission, routers, firewalls, switches, gateway computers and/or edge servers.

External components 900 include a computer display monitor 920, a keyboard 930, and a computer mouse 934. Internal components 800 also include device drivers 840 to interface to computer display monitor 920, keyboard 930 and computer mouse 934. The device drivers 840, R/W drive or interface 832 and network adapter or interface 836 comprise hardware and software (stored in one or more computer-readable tangible storage devices 830 and/or one or more computer-readable ROMs 824).

Transaction analyzer 130, lock wait time detector 132, and lock wait time resolver 134 can be written in various programming languages including low-level, high-level, object-oriented or non object-oriented languages. Alternatively, the functions of transaction analyzer 130, lock wait time detector 132, and lock wait time resolver 134 can be implemented in whole or in part by computer circuits and other hardware (not shown).

The description above has been presented for illustration purposes only. It is not intended to be an exhaustive description of the possible embodiments. One of ordinary skill in the art will understand that other combinations and embodiments are possible.

What is claimed is:

1. A method for reducing a lock wait time in a distributed processing environment having a plurality of nodes, the method comprising the steps of:

identifying a plurality of wait-for dependencies between a first plurality of transactions and a second plurality of transactions in a distributed processing environment, wherein the first plurality of transactions is waiting for the second plurality of transactions to release a plurality of locks on a plurality of shared resources;

collecting information associated with a potential global cycle from the plurality of nodes interconnected through a communication network, and each node is a separate individual computer, wherein the potential global cycle comprises a global wait-for graph cycle containing a node external and wherein the node external represents a second transaction from the second plurality of transactions holding one of the plurality of locks being waited for by a first transaction from the first plurality of transactions and wherein the first transaction has no information associated with the second transaction;

determining, by one or more processors, whether a global deadlock exists based on the collected potential global cycle information;

determining an amount of time the first plurality of transactions will wait for the second plurality of transactions in the distributed processing environment based on the plurality of wait-for dependencies between the first plurality of transactions and the second plurality of transactions and based on the collected potential global cycle and global deadlock information;

analyzing in response to determining the amount of time the first plurality of transactions, by one or more processors, historical transaction data related to the plurality of wait-for dependencies between the first plurality of transactions and the second plurality of transactions; and reducing the amount of time the first plurality of transactions will wait for the second plurality of transactions based on the historical transaction data.

2. The method of claim 1, wherein each lock from the plurality of locks is any one of a shared lock, an exclusive lock, or an intention lock.

3. The method of claim 1, wherein the step of identifying the plurality of wait-for dependencies between the first plurality of transactions and the second plurality of transactions further comprises the computer determining a plurality of local states for a plurality of processes initiated by the first and second plurality of transactions, wherein the plurality of local states identifies a plurality of dependencies between the plurality of processes and the plurality of shared resources.

4. The method of claim 1, wherein the historical transaction data comprises a lock history data, a lock table, and a usage pattern.

5. The method of claim 1, wherein the step of reducing the amount of time the first plurality of transactions will wait for the second plurality of transactions further comprises the computer adjusting a lock wait timeout threshold based on the historical transaction data.

6. A computer program product for reducing a lock wait time in a distributed processing environment having a plurality of nodes, the computer program product comprising one or more computer-readable storage hardware devices and program instructions stored on at least one of the one or more computer-readable storage hardware devices, the program instructions comprising:

program instructions to identify a plurality of wait-for dependencies between a first plurality of transactions and a second plurality of transactions in a distributed processing environment, wherein the first plurality of transactions is waiting for the second plurality of transactions to release a plurality of locks on a plurality of shared resources;

program instructions to collect information associated with a potential global cycle from the plurality of nodes interconnected through a communication network, and each node is a separate individual computer, wherein the potential global cycle comprises a global wait-for graph cycle containing a node external and wherein the node external represents a second transaction from the second plurality of transactions holding one of the plurality of locks being waited for by a first transaction from the first plurality of transactions and wherein the first transaction has no information associated with the second transaction;

program instructions to determine whether a global deadlock exists based on the collected potential global cycle information;

program instructions to determine an amount of time the first plurality of transactions will wait for the second plurality of transactions in the distributed processing environment based on the plurality of wait-for dependencies between the first plurality of transactions and the second plurality of transactions and based on the collected potential global cycle and global deadlock information;

program instructions to analyze, in response to determine the amount of time the first plurality of transactions, historical transaction data related to the plurality of wait-for dependencies between the first plurality of transactions and the second plurality of transactions; and program instructions to reduce the amount of time the first plurality of transactions will wait for the second plurality of transactions based on the historical transaction data.

7. The computer program product of claim 6, wherein each lock from the plurality of locks is any one of a shared lock, an exclusive lock, or an intention lock.

8. The computer program product of claim 6, wherein the program instructions to identify the plurality of wait-for dependencies between the first plurality of transactions and the second plurality of transactions further comprise program instructions to determine a plurality of local states for a plurality of processes initiated by the first and second plurality of transactions, wherein the plurality of local states identifies a plurality of dependencies between the plurality of processes and the plurality of shared resources.

9. The computer program product of claim 6, wherein the historical transaction data comprises a lock history data, a lock table, and a usage pattern.

10. The computer program product of claim 6, wherein the program instructions to reduce the amount of time the first plurality of transactions will wait for the second plurality of transactions further comprise program instructions to adjust a lock wait timeout threshold based on the historical transaction data.

11. A computer system for reducing a lock wait time in a distributed processing environment having a plurality of nodes, the computer system comprising one or more processors, one or more computer-readable memories, one or more computer-readable storage hardware devices, and program instructions stored on at least one of the one or more storage hardware devices for execution by at least one of the one or more processors via at least one of the one or more memories, the program instructions comprising:

program instructions to identify a plurality of wait-for dependencies between a first plurality of transactions and a second plurality of transactions in a distributed processing environment, wherein the first plurality of transactions is waiting for the second plurality of transactions to release a plurality of locks on a plurality of shared resources;

program instructions to collect information associated with a potential global cycle from the plurality of nodes interconnected through a communication network, and each node is a separate individual computer, wherein the potential global cycle comprises a global wait-for graph cycle containing a node external and wherein the node external represents a second transaction from the second plurality of transactions holding one of the plurality of locks being waited for by a first transaction from the first plurality of transactions and wherein the first transaction has no information associated with the second transaction;

program instructions to determine whether a global deadlock exists based on the collected potential global cycle information;

program instructions to determine an amount of time the first plurality of transactions will wait for the second plurality of transactions in the distributed processing environment based on the plurality of wait-for dependencies between the first plurality of transactions and the second plurality of transactions and based on the collected potential global cycle and global deadlock information;

program instructions to analyze, in response to determine the amount of time the first plurality of transactions, historical transaction data related to the plurality of wait-for dependencies between the first plurality of transactions and the second plurality of transactions; and program instructions to reduce the amount of time the first plurality of transactions will wait for the second plurality of transactions based on the historical transaction data.

12. The computer system of claim 11, wherein each lock from the plurality of locks is any one of a shared lock, an exclusive lock, or an intention lock.

13. The computer system of claim 11, wherein the program instructions to identify the plurality of wait-for dependencies between the first plurality of transactions and the second plurality of transactions further comprise program instructions to determine a plurality of local states for a plurality of processes initiated by the first and second plurality of transactions, wherein the plurality of local states identifies a plurality of dependencies between the plurality of processes and the plurality of shared resources.

14. The computer system of claim 11, wherein the historical transaction data comprises a lock history data, a lock table, and a usage pattern.

* * * * *